United States Patent [19]

Stafford

[11] 4,372,344
[45] Feb. 8, 1983

[54] BALL AND SOCKET JOINT WITH FLUID FLOW CAPABILITY THROUGH THE JOINT

[75] Inventor: Donald C. Stafford, Hindsdale, Ill.

[73] Assignee: Chicago Bridge & Iron Company, Oak Brook, Ill.

[21] Appl. No.: 191,717

[22] Filed: Sep. 29, 1980

[51] Int. Cl.³ .................... F16L 27/00; B63B 21/52
[52] U.S. Cl. .................................. 137/615; 285/163; 285/261; 441/5
[58] Field of Search ............... 137/615, 236 R, 236 S; 141/279, 284, 387, 388; 114/230, 264, 293; 9/8 P; 285/261, 163, 164

[56] References Cited

U.S. PATENT DOCUMENTS

| | | | |
|---|---|---|---|
| 3,614,869 | 10/1971 | Flery et al. ................. | 9p8 P X/ |
| 3,663,043 | 5/1972 | Walton ....................... | 285/264 X |
| 3,913,668 | 10/1975 | Todd et al. .................. | 285/261 X |
| 3,934,289 | 1/1976 | Shaw .......................... | 9/8 P |
| 4,155,670 | 5/1979 | Stafford ...................... | 285/264 X |
| 4,254,521 | 3/1981 | Pampmahl ................... | 0/8 P |

Primary Examiner—A. Michael Chambers
Attorney, Agent, or Firm—Merriam, Marshall & Bicknell

[57] ABSTRACT

A ball and socket articulated connection in which the socket has an associated enclosed chamber for fluid transfer through the connection. A fluid conduit hole extends through the ball and a fluid conduit communicates with the chamber. It can be used at the base of an offshore tower secured to a sea floor site.

15 Claims, 12 Drawing Figures

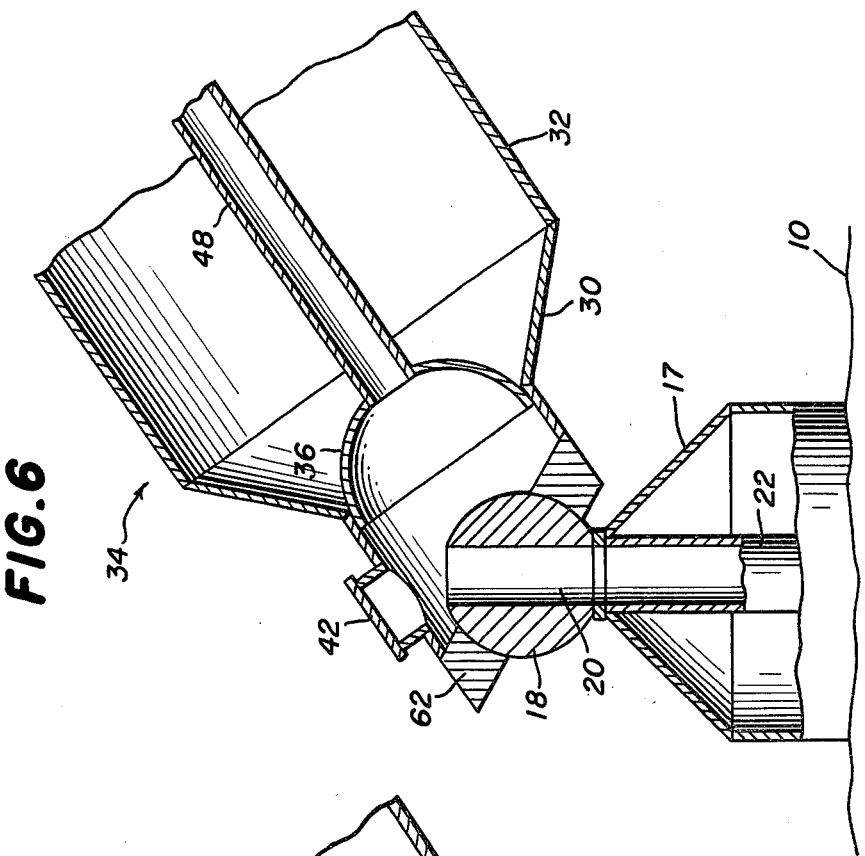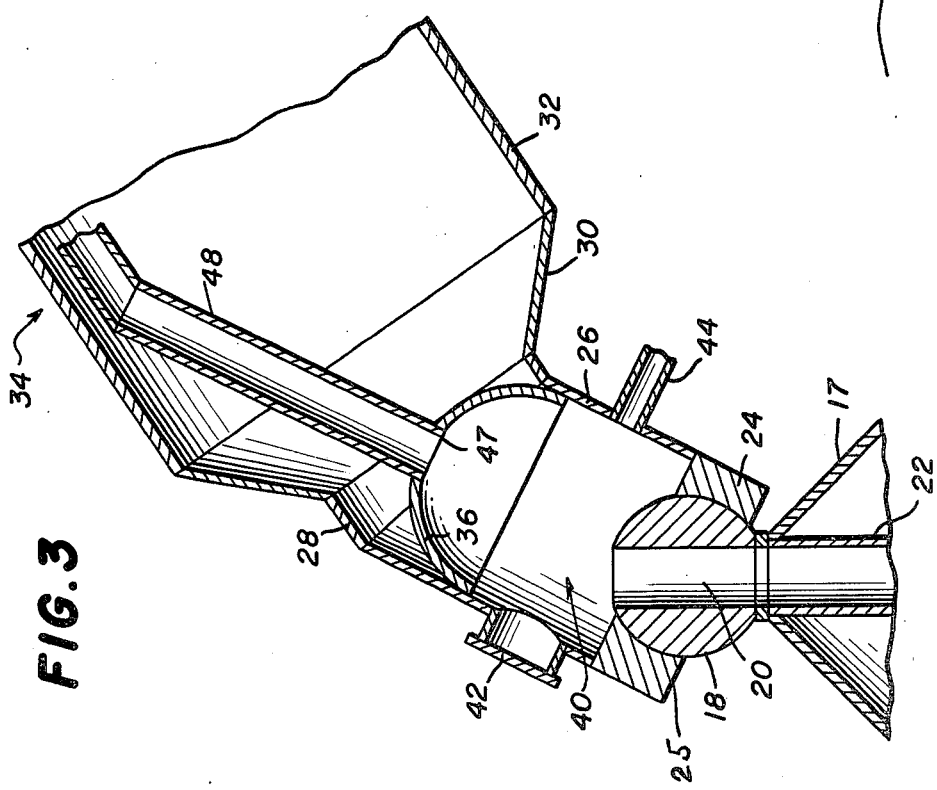

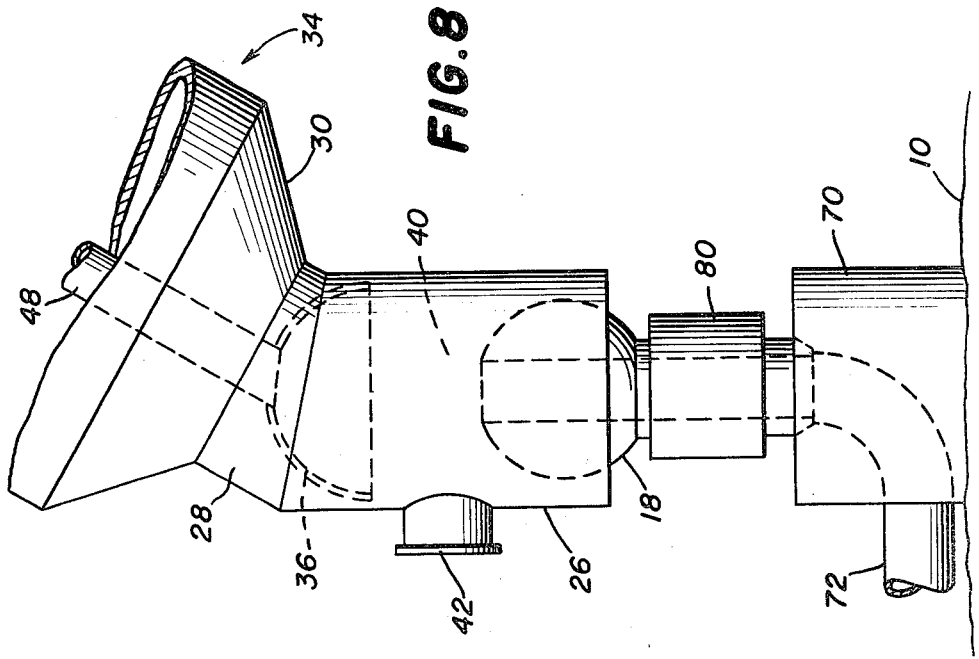
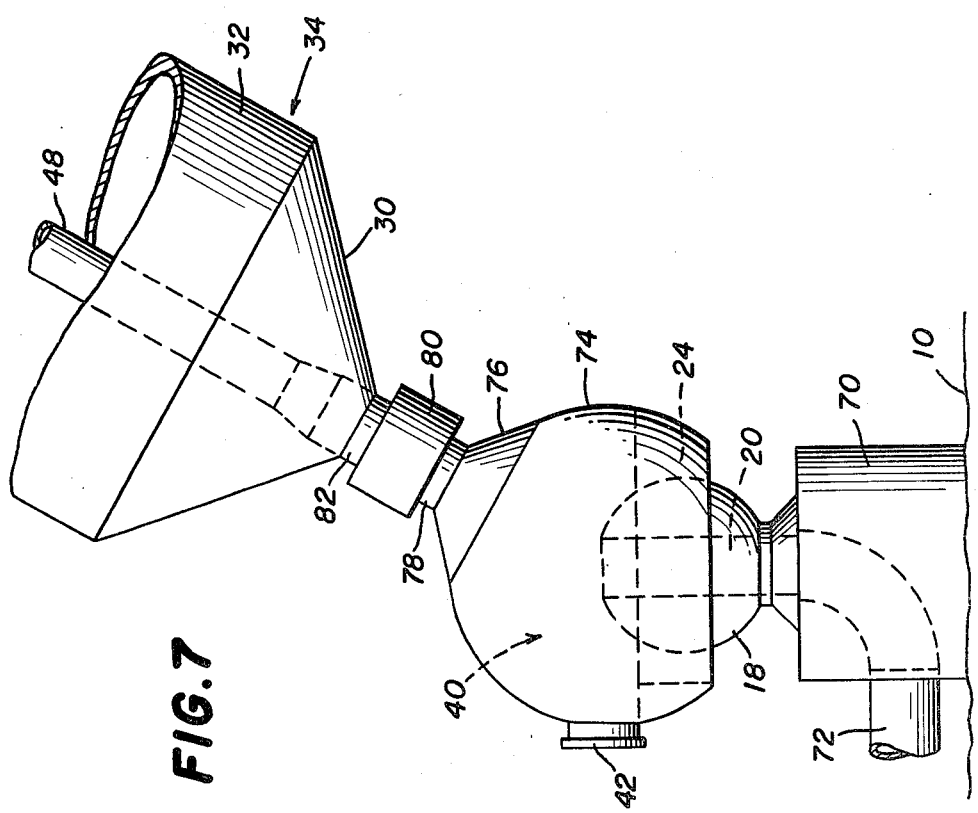

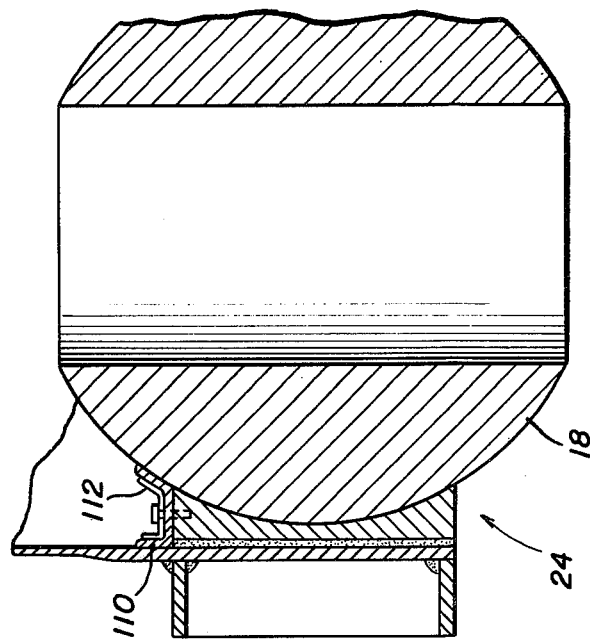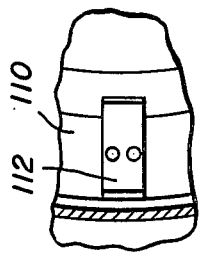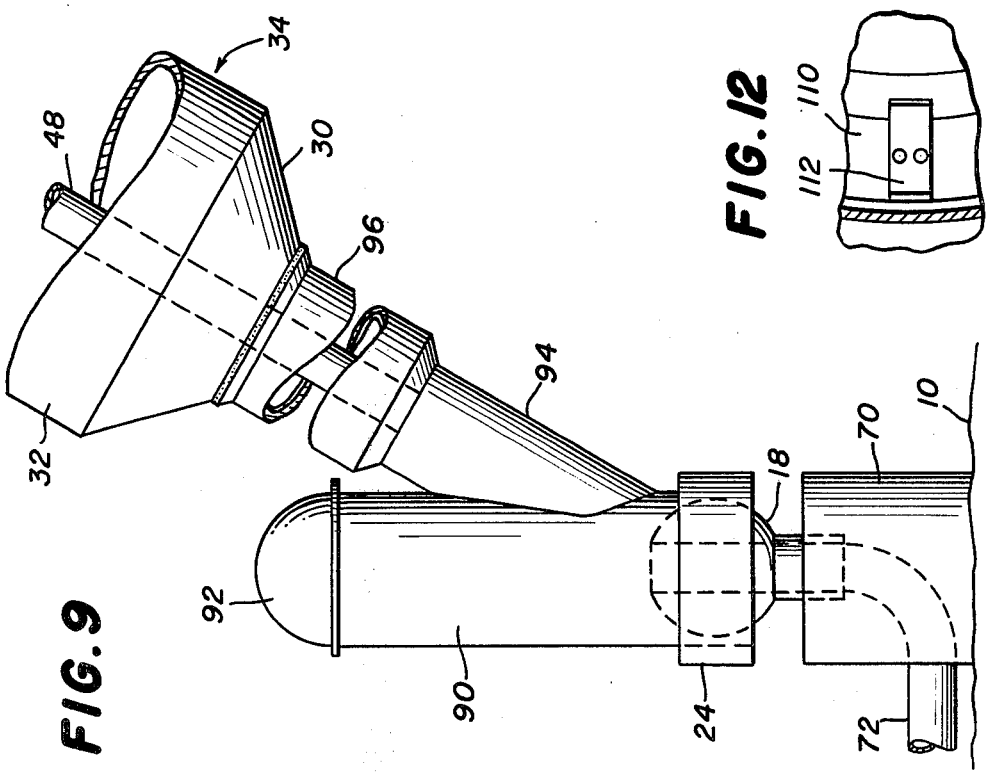

BALL AND SOCKET JOINT WITH FLUID FLOW CAPABILITY THROUGH THE JOINT

This invention relates to apparatus for effecting fluid flow past an articulated joint between two members. More particularly, this invention relates to a ball and socket swivel with an associated chamber which permits fluid flow through the swivel between two angularly displaceable conduits, and especially such a swivel suitable for anchoring an offshore tower to a sea floor.

BACKGROUND OF THE INVENTION

Ball and socket articulated or swivel joints have been widely used for many years. These joints can employ a ball and socket with continuous uninterrupted mating or nesting surfaces when only a mechanical capability is sought. However, a conduit or hole is provided in both the ball and socket when it is necessary or desirable to pass a rod, cable or the like through the joint or when the joint is to be used as a fluid swivel through which a fluid is to flow. Ball and socket joints with fluid flow capability across the joint are generally limited as to angular displacement because of the necessity to have the hole in the ball at least in partial fluid flow direct engagement with a similar hole in the socket.

Two present fields greatly interested in ball and socket joints is in offshore oil production, processing and transfer, and for ship mooring. Offshore buoyant towers supported by the sea floor are used for oil exploration and production and mooring tankers. Such towers are sometimes advantageously secured to the sea floor through an articulated or swivel joint. Ball and socket joints have already been proposed for that purpose. See U.S. Pat. Nos. 4,155,670; 4,058,137; 4,048,944; 3,720,066; 3,708,985; 3,667,239; 3,572,408; and 2,988,144. The prior art, however, does not provide a ball and socket joint with a capability for fluid flow past the joint through a relatively large angular displacement.

SUMMARY OF THE INVENTION

According to the invention there is provided apparatus comprising a ball joined to a first element with a hole through the ball and first element; a socket having a spherical internal surface; a shell, joined to the socket, defining an enclosed chamber; said socket containing the ball in mating and nesting fluid tight arrangement with the hole in the ball in fluid communication with the chamber; and a fluid conduit in communication with the chamber.

An access door to the chamber is desirably included so that a seal between the ball and socket can be replaced. Also, when the ball and socket joint is used on an offshore tower, access to the chamber can facilitate pigging a pipeline in the tower or communicating with the sea floor.

The socket is generally joined to a second element, which can be an offshore buoyant tower or a base secured to a sea floor. A fluid conduit can extend into the tower from the chamber for conveying a fluid through the tower to a destination. Consistent therewith, the first element can be adapted to be secured to a sea floor or to the tower.

The socket or the ball can be connected to the tower by means which permits the tower to incline at an angle of about 30° to 60° from the horizontal. To facilitate such angular displacement the socket, when connected to the tower, can be sloped at the bottom at an oblique angle from the tower longitudinal axis.

A second conduit can be positioned to communicate with the chamber, and the conduit can contain a valve. This conduit can be used to flood the chamber with sea water to drive out oil.

A quick connect-disconnect connector can be used to secure the ball and socket joint, including the chamber, as a unit to an object such as a sea floor base or to the lower end of an offshore tower. Thus, a quick connect-disconnect connector can be joined to the first element, which is attached to the ball, and the connector in turn can be secured to a sea floor base. Alternatively, the quick connect-disconnect connector can be joined to the chamber, and the connector then joined to the lower end of an offshore tower. The fluid conduit in communication with the chamber can be in fluid communication with the connector or it can by-pass the connector.

BRIEF DESCRIPTION OF THE DRAWINGS

FIG. 3 is a vertical sectional view through the ball and socket connection shown in FIG. 2;

FIG. 6 is a vertical sectional view of the ball and socket connection shown in FIG. 5;

FIG. 7 is an elevational view of a third embodiment of ball and socket connection with a quick connect-disconnect connector joining an offshore tower to a chamber associated with the socket;

FIG. 8 is an elevational view of a ball and socket joint, to which an offshore tower is connected, having a quick connect-disconnect connector joining the ball to a base on a sea floor;

FIG. 9 is an elevational view of a ball and socket connection with a fourth embodiment of fluid transport chamber associated with the socket;

FIG. 11 is a sectional view through a ball and socket connection and shows a seal which can be used to keep fluid from leaking out of the chamber; and FIG. 12 is a partial plan view of the seal illustrated in FIG. 11.

DETAILED DESCRIPTION OF THE DRAWINGS

To the extent it is practical and convenient, the same or similar elements which appear in the various views of the drawings will be identified by the same numbers.

Figure 1:
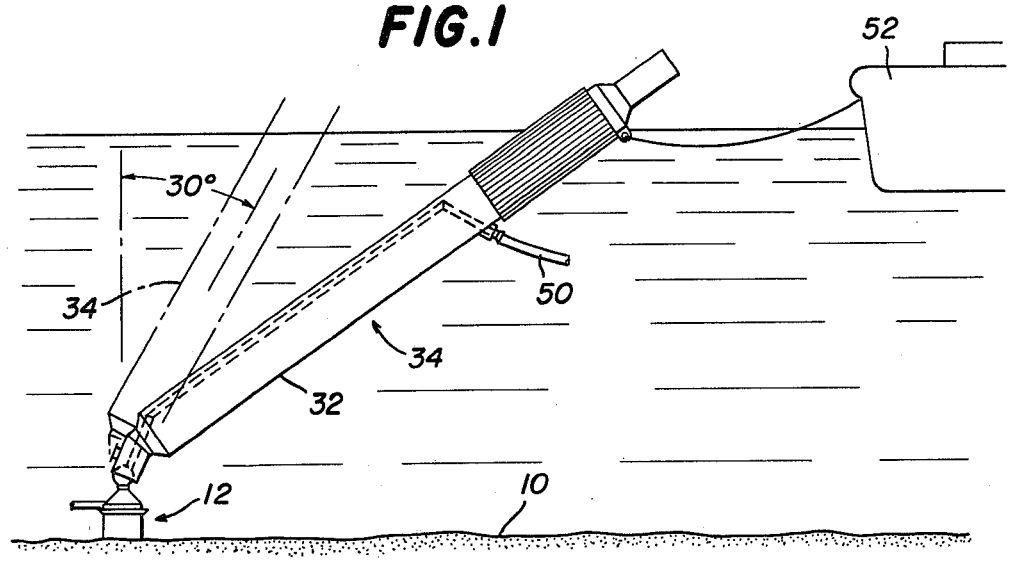
FIG. 1 is an elevational view of an offshore tower secured to a sea floor by a ball and socket articulated connection in which the socket has an associated enclosed chamber for fluid transfer through the connection.
Figure 2:
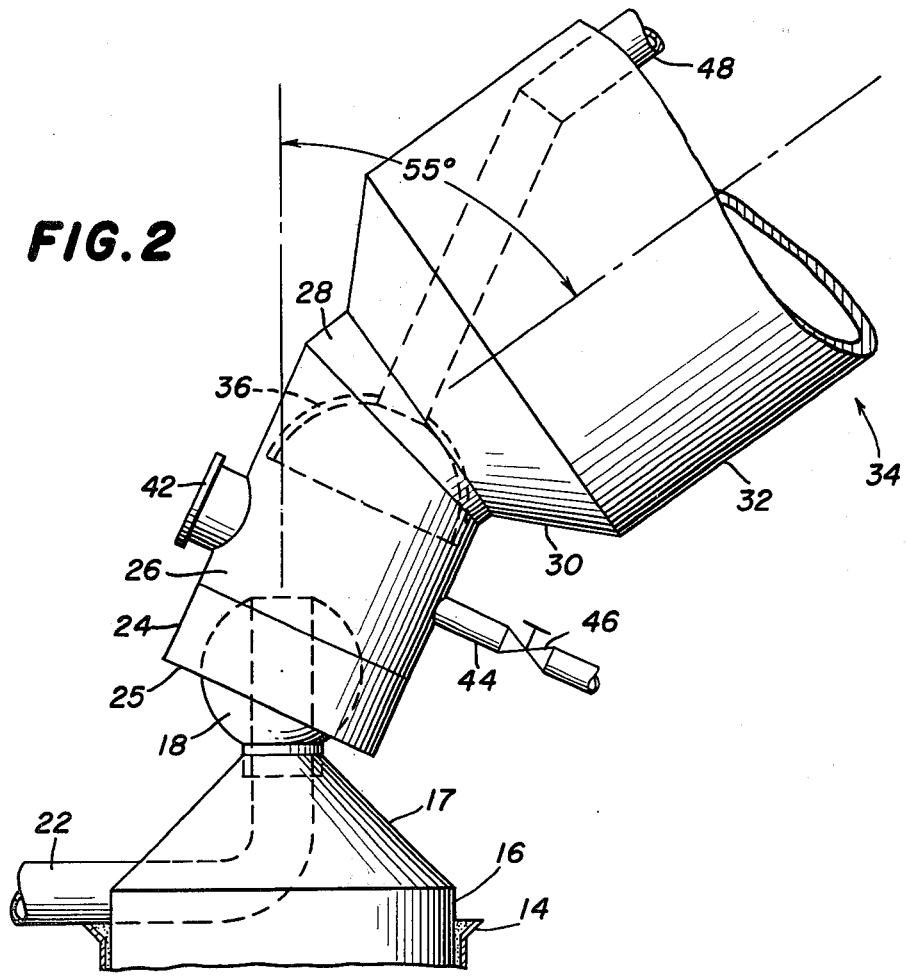
FIG. 2 is an enlarged elevational view of the ball and socket connection shown in FIG. 1.

FIGS. 1 to 3 illustrate a first embodiment of the invention. Mounted on sea floor 10 is a base 12 having a cylindrical shell 14 anchored in the sea floor and a cylindrical member 16 grouted in shell 14. Ball 18 is joined to the truncated conical top 17 of member 16. A vertical hole 20 extends axially through ball 18 into communication at its lower end with fluid conduit 22.

Socket 24 partially surrounds and engages ball 18 in a rotatable, fluid tight mating and nesting arrangement. Cylindrical shell 26 is joined at its lower end to socket 24 and the upper, oblique end is joined to oblique cylindrical section 28. Truncated conical shell member 30 extends from cylindrical section 28 to the column 32 of the offshore tower 34. Hemispherical shell 36 is welded in position near the upper end of cylindrical shell 26. The hemispherical shell 36, part of shell 26 and the socket 24 together define an enclosed fluid chamber 40. Access door 42 provides a removable closure by means of which the chamber 40 interior can be reached. Door 42 desirably is made large enough for a person to enter the chamber and perform any maintenance required. Conduit 44 containing valve 46 also communicates with the chamber 40 and provides a means for flooding the chamber with sea water when access to the enclosed chamber is scheduled, such as by a diver.

Conduit 48 communicates at its lower end with chamber 40 through a hole in shell 36. Conduit 48 runs upwardly in tower 34 and then at some suitable point it egresses so that a hose 50 can be joined to it and run to a tanker 52.

The offshore buoyant tower 34 shown in FIGS. 1 to 3 is calculated to incline at 30° in still water with no tanker moored to it. When the tower inclines 30°, the bottom 25 of socket 24 will be horizontal. However, it is calculated that a maximum tanker load will pull the tower over to 55°±10°. At the maximum angle of incline the bottom 25 of the socket 24 will be unrestrained by truncated conical shell 17. Of course, the tower is free to rotate 360° around a vertical axis so that it can readily weathervane with wind and sea currents. In addition, reasonable axial rotation about the tower axis is accommodated by the ball and socket swivel or articulated connection.

Not only does the ball and socket connection illustrated by FIGS. 1 to 3 permit the tower to swivel but, furthermore, it provides in combination with chamber 40 a highly effective fluid swivel. Thus, a fluid such as oil or natural gas can be fed by conduit 22, through hole 20 in ball 18, into chamber 40. From there the fluid can flow into conduit 48 and be delivered to a suitable destination. The described fluid swivel permits such fluid flow while the tower oscillates and weathervanes.

Figure 5:
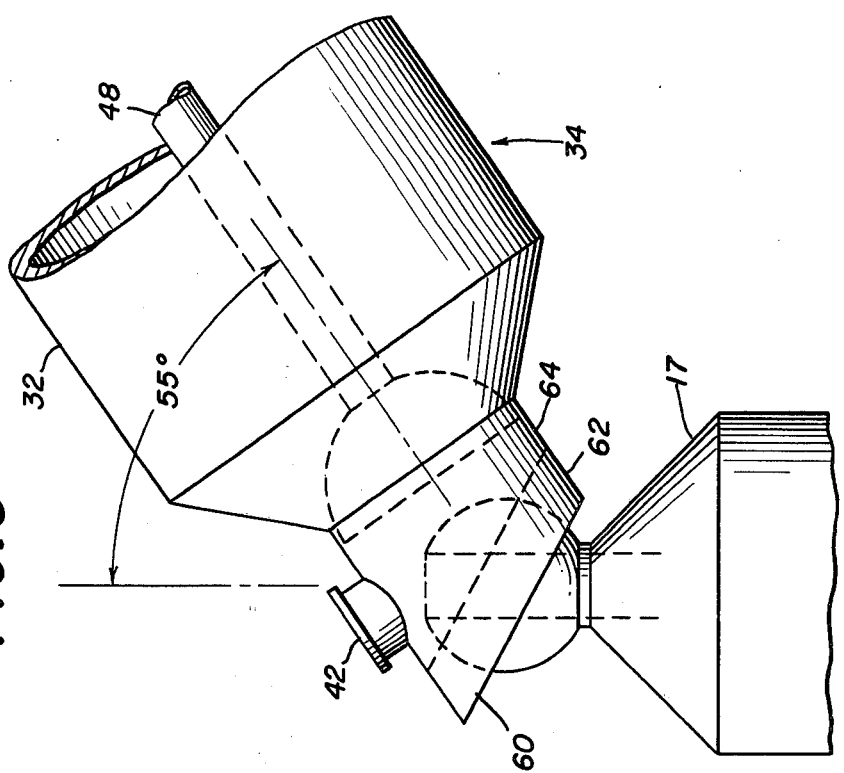
FIG. 5 is an elevational view of the ball and socket connection, shown in FIG. 4, tilted 55°.
Figure 4:
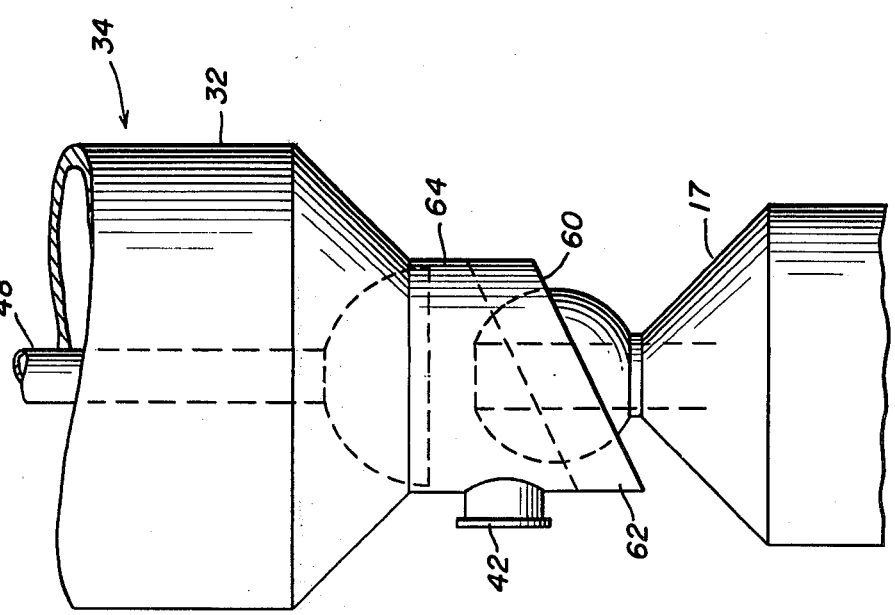
FIG. 4 is an elevational view of a second embodiment of ball and socket connection in vertical position having an associated chamber.

FIGS. 4 to 6 illustrate a second embodiment of the invention which is intended for use on a buoyant offshore tower which is designed to be nearly vertical in still water with no tanker pull applied to it. There are many similarities between this embodiment and the embodiment shown in FIGS. 1 to 3. Therefore, the common elements will be identified in FIGS. 4 to 6 using therein the identifying numbers employed for the same elements or features present in FIGS. 1 to 3.

Because the tower shown in FIGS. 4 to 6 is intended to be nearly vertical in still water, the socket 62 is positioned obliquely in cylindrical shell 64 so that the bottom 60 of the socket is also oblique. As shown in FIG. 5, the tower 34 can incline to 55° without the socket bottom 60 coming into contact with the ball connection to truncated conical shell 17.

A third embodiment of the invention is illustrated by FIG. 7. Base 70 is secured to sea floor 10. Conduit 72 extends through base 70 into communication with hole 20 extending vertically through ball 18. Socket 24 is mounted securely in the bottom portion of spherical shell 74 thereby defining a chamber 40. Truncated conical member 76 is joined to shell 74 and to conduit portion 78. Quick connect-disconnect connector 80 joins conduit portion 78 to conduit portion 82 mounted at the lower end of truncated conical shell 30. Conduit 48 is connected at its lower end to conduit portion 82.

A Vetco Company H4 quick connect-disconnect connector can be used for connector 80.

The embodiment illustrated by FIG. 7 has all of the advantages described above in connection with FIGS. 1 to 6 plus the ability to quickly connect and disconnect tower 34 from the ball and socket swivel. As a result the ball and socket swivel can be anchored to the sea floor before the tower is connected. The tower can be moved into position later and the tower bottom submerged until the connector 80 mating elements are brought together and united to complete the connection. Of course, the tower can be readily removed later by remotely activating the connector 80 to free the tower from the ball and socket swivel.

FIG. 8 illustrates a fourth embodiment of the invention. In this embodiment a quick connect-disconnect connector 80 is positioned between base 70 on the sea floor and ball 18 about which tower 34 swivels. The advantage of this embodiment is that it permits removal of the ball and socket with the tower so that those important structural parts need not be abandoned on the sea floor if the tower is moved to a different location.

Another embodiment of the invention is illustrated by FIG. 9. As shown in this figure, ball 18 is mounted in a socket 24 to which vertical cylindrical shell 90 is joined. Shell 90 has a removable closure 92. Hollow leg 94 branches outwardly from shell 90 and connects with cylindrical member 96 which, in turn, is joined to truncated conical member 30 at the base of tower column 34. This type of ball and socket connection permits the tower 34 to be inclined in still water yet it provides a vertical access shell 90 through which a diver can reach the ball 18 to repair the seal extending from the socket to the ball.

Figure 10:
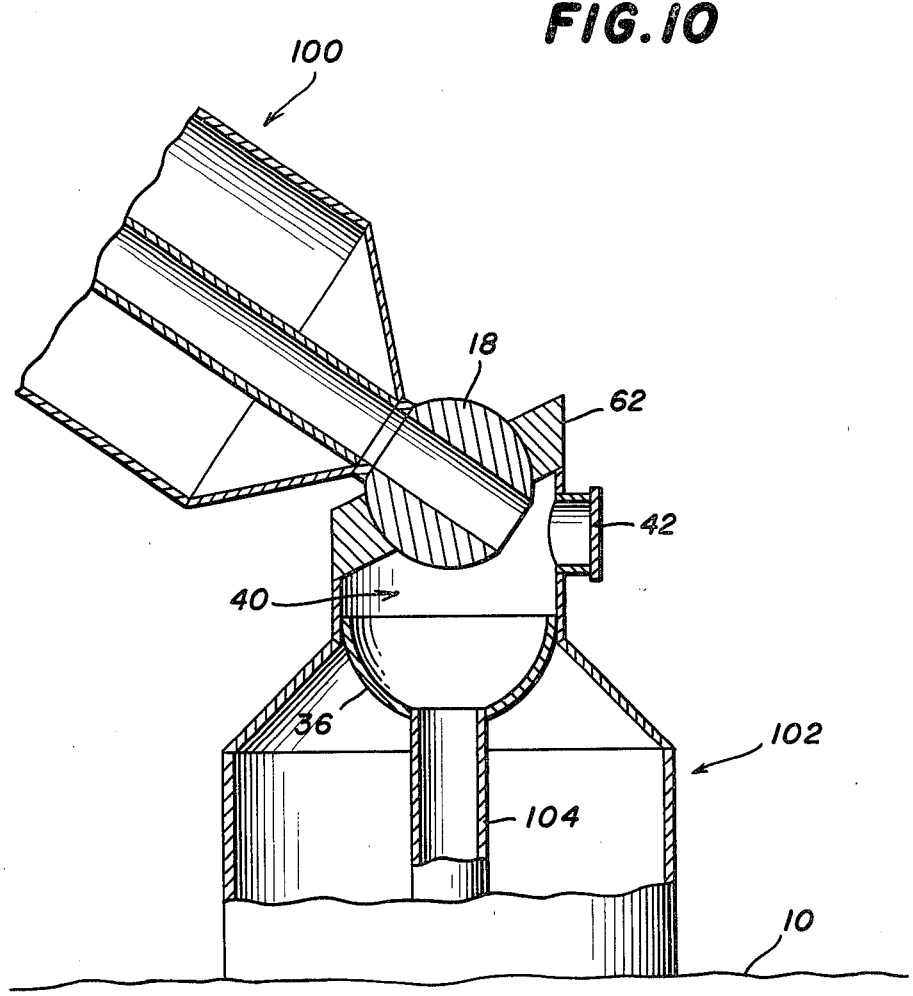
FIG. 10 is a vertical sectional view of a ball and socket swivel in which the ball, rather than the socket, is mounted on the tower bottom.

FIG. 10 illustrates still another embodiment of the invention. In this embodiment ball 18 is mounted at the bottom of buoyant offshore tower 100. The socket 62 is mounted to a base 102 suitably secured to sea floor 10. Conduit 104 can extend from a well or a fluid delivery pipeline on the sea floor. It will be readily appreciated that this embodiment is essentially a reverse arrangement of that illustrated by FIG. 6 and it is presented to show that, in general, either the ball or the socket can be secured to the sea floor with the other part thereof secured to the tower base.

FIGS. 11 and 12 illustrate one type of seal extending from the socket to the ball which can be used to make the swivel fluid tight and to keep the ball surface free of sand, and to keep the ball surface in contact with sea water free of oil if oil is in chamber 40. An elastomeric strip 110 is positioned on top of socket 24 with its inner edge in contact with the surface of ball 18. Flat springs 112, positioned in spaced apart relationship to each other, hold the strip 110 in place and press it against the ball surface, thereby producing a fluid tight seal.

The foregoing detailed description has been given for clearness of understanding only and no unnecessary limitations should be understood therefrom as modifications will be obvious to those skilled in the art.

What is claimed is:

1. Apparatus comprising:

a ball joined to a first element with a hole extending through the ball and first element;

a socket having a spherical internal surface;

a shell, having an end portion directly joined to the socket, defining with soil socket enclosed chamber;

said socket containing the ball in mating and nesting fluid tight arrangement with the hole in the ball in direct fluid communication with and running out from the chamber; and a fluid conduit in communication with the chamber.

2. Apparatus according to claim 1 including an access door to the chamber.

3. Apparatus according to claim 1 in which the socket is joined to a second element.

4. Apparatus according to claim 3 in which the second element is an offshore buoyant tower.

5. Apparatus according to claim 4 in which the fluid conduit extends into the tower from the chamber.

6. Apparatus according to claim 4 in which the socket is connected to the tower by means which permits the tower to incline at an angle of about 30° to 60° from the horizontal.

7. Apparatus according to claim 6 in which the socket is sloped at an angle from the tower longitudinal axis.

8. Apparatus according to claim 4 in which the first element is adapted to be secured to a sea floor 9. Apparatus according to claim 1 including a second conduit communicating with the chamber and a valve in the second conduit.

10. Apparatus according to claim 1 in which the first element is joined to a quick connect-disconnect connector.

11. Apparatus according to claim 10 in which a base is secured to a sea floor and means joins the connector to the base.

12. Apparatus according to claim 1 in which a quick connect-disconnect connector is joined to the fluid conduit in communication with the chamber.

13. Apparatus according to claim 12 in which an offshore tower is joined to the connector.

14. Apparatus according to claim 1 in which a quick connect-disconnect connector is joined to the chamber.

15. Apparatus according to claim 14 in which an offshore towar is joined to the connector.

* * * * *

UNITED STATES PATENT AND TRADEMARK OFFICE
CERTIFICATE OF CORRECTION

PATENT NO. : 4,372,344
DATED : February 8, 1983
INVENTOR(S) : DONALD CLAUDE STAFFORD It is certified that error appears in the above-identified patent and that said Letters Patent are hereby corrected as shown below:

Title page, "References Cited", change "Flery" to --Flory--;

change "9p8" to --9/8--; change "Pampmahl" to --Papmahl--;

change "0/8 P" to --9/8 P--.

Column 5, line 5, before "enclosed" insert --an--; column 6, line 22, change "towar" to --tower--.

Signed and Sealed this

Twelfth Day of April 1983

[SEAL]

Attest:

Attesting Officer

GERALD J. MOSSINGHOFF

Commissioner of Patents and Trademarks